(12) United States Patent
Yoshitake et al.

(10) Patent No.: US 9,159,505 B2
(45) Date of Patent: Oct. 13, 2015

(54) ELECTRIC STORAGE DEVICE

(75) Inventors: Shinsuke Yoshitake, Kyoto (JP);
Satoshi Murakami, Kyoto (JP);
Tomonori Kishimoto, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 69 days.

(21) Appl. No.: 13/600,032

(22) Filed: Aug. 30, 2012

(65) Prior Publication Data
US 2013/0052531 A1 Feb. 28, 2013

(30) Foreign Application Priority Data
Aug. 31, 2011 (JP) .................................. 2011-188550

(51) Int. Cl.
| | |
|---|---|
| *H01M 4/64* | (2006.01) |
| *H01G 11/76* | (2013.01) |
| *H01M 2/26* | (2006.01) |
| *H01M 10/04* | (2006.01) |
| *H01G 11/72* | (2013.01) |
| *H01G 11/82* | (2013.01) |
| *B23K 20/10* | (2006.01) |

(Continued)

(52) U.S. Cl.
CPC ............... *H01G 11/76* (2013.01); *H01G 11/72* (2013.01); *H01G 11/82* (2013.01); *H01M 2/263* (2013.01); *H01M 2/266* (2013.01); *H01M 10/0413* (2013.01); *H01M 10/0431* (2013.01); *B23K 20/10* (2013.01); *H01M 2/347* (2013.01); *H01M 10/0525* (2013.01); *Y02E 60/13* (2013.01)

(58) Field of Classification Search
CPC ............. H01M 2/266; H01M 10/0431; H01M 10/0413
USPC .......................................................... 429/211
See application file for complete search history.

(56) References Cited

U.S. PATENT DOCUMENTS

| | | |
|---|---|---|
| 2006/0051664 A1 | 3/2006 | Tasai et al. |
| 2009/0004561 A1 | 1/2009 | Nansaka et al. |
| 2009/0004562 A1 | 1/2009 | Inagaki et al. |

(Continued)

FOREIGN PATENT DOCUMENTS

| | | |
|---|---|---|
| JP | 2007-053002 A | 3/1997 |
| JP | 10-106536 A | 4/1998 |

(Continued)

OTHER PUBLICATIONS

European Search Report dated Oct. 16, 2013.
Extended European Search Report dated Dec. 21, 2012.

*Primary Examiner* — Nicholas P D'Aniello
(74) *Attorney, Agent, or Firm* — McGinn IP Law Group, PLLC.

(57) ABSTRACT

An electric storage device, including: an electrode assembly having at least one protrusion portion, the protrusion portion being formed of an end portion of any one of a positive electrode foil and a negative electrode foil and protruding in a laminated state from a side end of the other electrode foil of the both electrode foils; a current collector having a contact portion in contact with the protrusion portion; and a metal material that joins the protrusion portion by interposing the protrusion portion between the contact portion of the current collector and the metal material, wherein at least an end region in one direction along the opposing face is displaced in a direction away from the contact portion of the current collector than a central region of the opposing face is.

10 Claims, 10 Drawing Sheets

(51) Int. Cl.
*H01M 10/0525* (2010.01)
*H01M 2/34* (2006.01)

(56) References Cited

U.S. PATENT DOCUMENTS

2010/0203371 A1 8/2010 Nagai et al.
2010/0310927 A1* 12/2010 Imai et al. .................... 429/174
2011/0076569 A1 3/2011 Kimura et al.

FOREIGN PATENT DOCUMENTS

| JP | 10-244380 A | 9/1998 |
| JP | 2001-038475 A | 2/2001 |
| JP | 2003-187778 A | 7/2003 |
| JP | 2003-249423 A | 9/2003 |
| JP | 2005-216825 A | 8/2005 |
| JP | 2009-259697 A | 11/2009 |
| JP | 4491747 B2 | 6/2010 |
| JP | 2010-272324 A | 12/2010 |

* cited by examiner

ELECTRIC STORAGE DEVICE

CROSS REFERENCE TO RELATED APPLICATION

The present invention claims the priority of Japanese Patent Application No. 2011-188550, which is herein incorporated by reference.

FIELD OF THE INVENTION

The present invention relates to an electric storage device such as a lithium-ion secondary battery cell. More particularly, the present invention relates to an electric storage device provided with an electrode assembly including a positive electrode foil and a negative electrode foil which are insulated from each other, and a current collector.

BACKGROUND ART

As this type of electric storage device, those described in Patent Document 1 (Japanese Patent Laid-Open No. 2007-53002) and Patent Document 2 (Japanese Patent Laid-Open No. 2001-38475) are known. The lithium secondary battery cell 1 (electric storage device) described in Patent Document 1 includes: an electrode unit 10 (electrode assembly) having a pair of current-collecting-terminal connection portions 122a and 142a (protrusion portions) in which an end portion of each of a positive electrode sheet 12 (positive electrode foil) and a negative electrode sheet 14 (negative electrode foil), which are wound around into a flat shape, protrude from a side end of another one in a laminated state; a positive current collecting terminal 22 (current collector) joined to the current-collecting-terminal connection portion 122a of positive electrode by ultrasonic welding; and a negative current collecting terminal 32 (negative collector) joined to the current-collecting-terminal connection portion 142a of negative electrode by ultrasonic welding. Further, a battery cell (electric storage device) described in Patent Document 2 includes: a winding-type electrode assembly 1 (electrode assembly) having a pair of joint portions (protrusion portions) in which an end of each of a positive electrode plate 11 (positive electrode foil) and a negative electrode plate 12 (negative electrode foil) which are wound into a flat shape, protrudes from a side end of another one in a laminated state; and a current outlet terminal 2 and a buffer plate 4 (metal material) each of which is joined by ultrasonic welding in a state of being laid on top of the front or back side of each joint portion.

As shown on the upper sides of FIGS. 10A and 10B, an electrode foil of opposite side (not shown) and a separator (not shown) as an insulation material lie between electrode foils 8. As a result, a protrusion portion 8A of an electrode assembly obviously has a thickness larger than a dimension of the thickness of the electrode foil 8 multiplied by the number thereof. In Patent Document 1, as shown in FIG. 10A, ultrasonic welding is conducted in state that a contact portion 3A of a current collector is placed on an anvil 30 which is a pedestal portion of a welding machine, the protrusion portion 8A is placed on the contact portion 3A, and a tip (or a horn) 31 of the welding machine is held in direct contact with the protrusion portion 8A. In such a condition, the protrusion portion 8A bends abruptly and significantly at a boundary between a portion which is pressurized by the tip 31 and a portion which is not pressurized by the tip 31. If, in that state, the protrusion portion 8A is subjected to ultrasonic vibration, it becomes more likely that unfavorable conditions such as cracking and breakage thereof occur, above all, on the front face side of the protrusion portion 8A. Moreover, if such an unfavorable condition occurs, the conductivity is adversely affected, which may lead to adverse effects on the ability (performance) as the secondary battery cell such as durability and reliability.

It is conceivable, as a countermeasure, to hold the tip 31 in contact with the protrusion portion 8A via a metal material 13 as with Patent Document 2. However, when the metal material 13 has a high rigidity, such as when the thickness of the metal material 13, which has a uniform thickness, is sufficiently large, the metal plate 13 which is pressurized by the tip 31 will pressurize the protrusion portion 8A without being deformed as shown in FIG. 10B. If that case, stress concentration occurs at a portion corresponding to an end of the metal material 13 in the protrusion portion 8A, and unfavorable conditions such as cracking or tearing become more likely to occur in a portion surrounded by a circle in FIG. 10B. That is, the portion where unfavorable conditions occur has just moved from an end of the tip 31 to an end of the metal material 13, and the above described unfavorable conditions themselves are still likely to occur.

SUMMARY OF THE INVENTION

It is an object of the present invention to provide an electric storage device which can prevent the occurrence of unfavorable conditions such as cracking or tearing in a protrusion portion of an electrode assembly when jointing a current collector to the protrusion portion of the electrode assembly.

According to the present invention, there is provided an electric storage device, which includes:

an electrode assembly including a positive electrode foil and a negative electrode foil, which are laminated into a multilayer in a mutually insulated state, the electrode assembly having at least one protrusion portion, the protrusion portion being formed of an end portion of any one of the positive electrode foil and the negative electrode foil and protruding in a laminated state from a side end of the other electrode foil of the both electrode foils;

a current collector having a contact portion in contact with the protrusion portion; and a metal material having an opposing face opposed to the protrusion portion, the metal material being configured to join the protrusion portion by interposing the protrusion portion between the contact portion of the current collector and the metal material, wherein among end regions of the opposing face of the metal material, at least an end region in one direction along the opposing face is displaced in a direction away from the contact portion of the current collector than a central region of the opposing face is.

According to the present invention, there is further provided an electric storage device, which includes:

an electrode assembly including a positive electrode foil and a negative electrode foil, which are laminated into a multilayer in a mutually insulated state, the electrode assembly having at least one protrusion portion, the protrusion portion being formed of an end portion of any one of the positive electrode foil and the negative electrode foil and protruding in a laminated state from a side end of the other electrode foil of the both electrode foils;

a current collector having a contact portion in contact with the protrusion portion; and a metal material having an opposing face opposed to the protrusion portion, the metal material being configured to join the protrusion portion by interposing the protrusion portion between the contact portion of the current collector and the metal material, wherein a central region of the opposing face of the metal material is displaced in a direction toward the contact portion of the current collector than at least an end region of the opposing face of the metal material in one direction along the opposing face is.

According to the present invention, there is still further provided an electric storage device, which includes:

an electrode assembly including a positive electrode foil and a negative electrode foil, which are laminated into a multilayer in a mutually insulated state, the electrode assembly having at least one protrusion portion, the protrusion portion being formed of an end portion of any one of the positive electrode foil and the negative electrode foil and protruding in a laminated state from a side end of the other electrode foil of the both electrode foils;

a current collector having a contact portion in contact with the protrusion portion; and a metal material having an opposing face opposed to the protrusion portion, the metal material being configured to join the protrusion portion by interposing the protrusion portion between the contact portion of the current collector and the metal material, wherein the metal material is formed such that a thickness of a portion of the protrusion portion interposed by the contact portion of the current collector and the metal material increases at least in an end portion in one direction along the opposing face.

DETAILED DESCRIPTION OF THE PREFERRED EMBODIMENTS

Hereafter, as one embodiment of the electric storage device according to the present invention, a battery cell, specifically a non-aqueous electrolyte secondary battery cell, more specifically a lithium-ion secondary battery cell will be described with reference to the drawings. Hereafter, regarding the current collectors of positive and negative electrodes and the structures thereof, description will be made basically only on one side (negative electrode side), and the other side (positive electrode side) will be given a corresponding reference symbol, thereby supposing that description thereof has been made.

<Embodiment 1>

Figure 1:
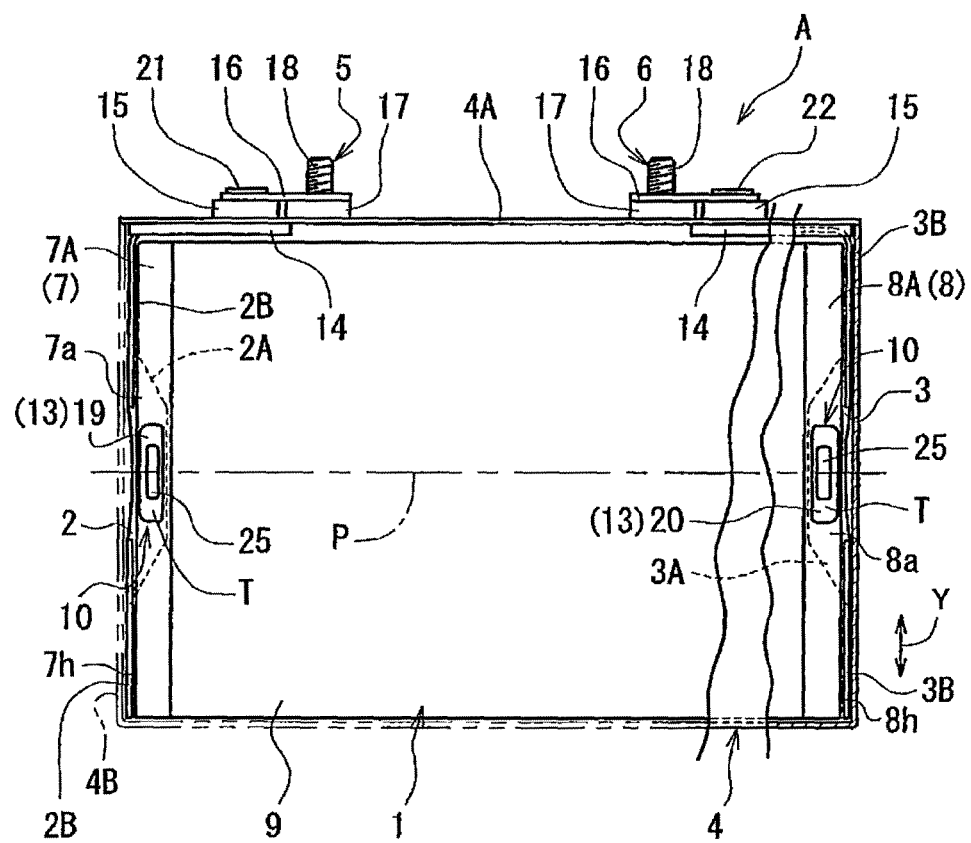
FIG. 1 is a partially broken-away front view showing a lithium-ion secondary battery cell relating to the present embodiment.
Figure 2:
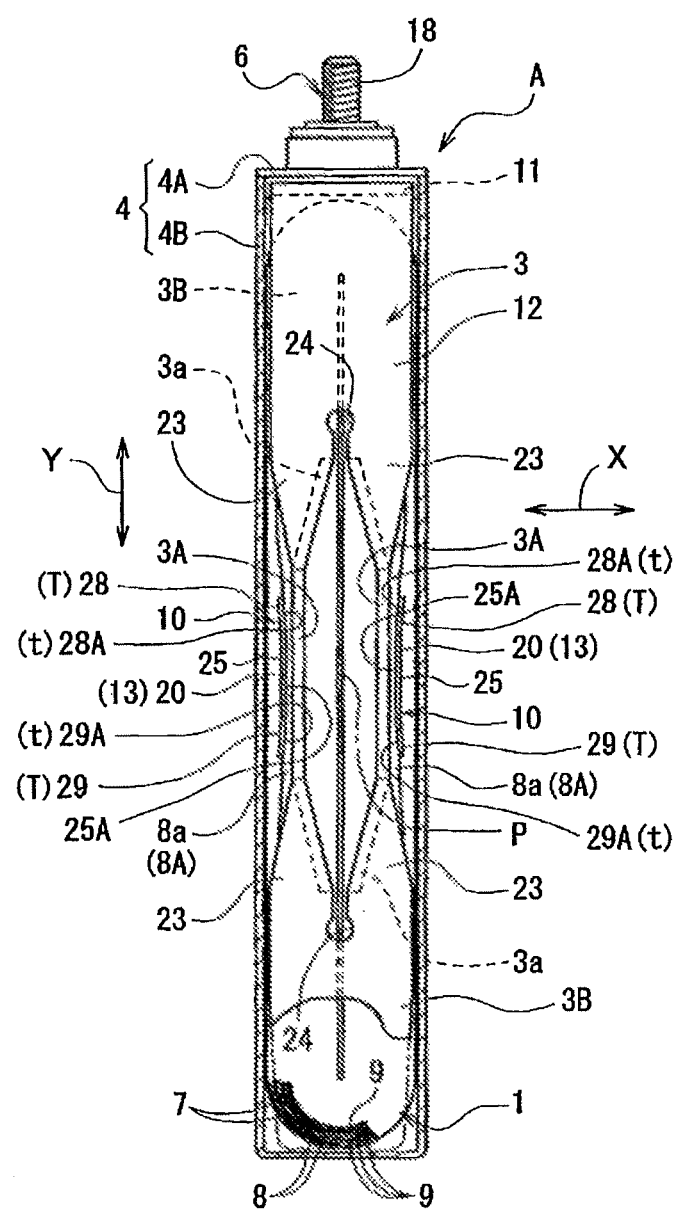
FIG. 2 is a side view showing the structure of a principal part of the lithium-ion secondary battery cell.

A battery cell A according to Embodiment 1 is shown in FIGS. 1 and 2. The battery cell A is a flat and longitudinally oriented square-shaped battery cell in which a power generating element 1 as the electrode assembly, current collectors 2 and 3 of positive and negative electrodes, and electrolyte (not shown) are contained in a case 4 formed of a hard plate of such as aluminum alloy or stainless alloy. Electrode portions 5 and 6 of positive and negative electrodes which are connected in a conductive manner to the current collectors 2 and 3 are provided in a top plate 4A of the case 4. The case 4 is fabricated by integrating a body case portion 4B which has an opening portion, with the top plate 4A which covers the opening portion of the body case portion 4B by laser welding, etc. It is noted that, although not shown, an insulation material, such as a plastic bag which contains the power generating element 1 and the current collectors 2 and 3, is provided between the power generating element 1 and a pair of the current collectors 2 and 3, and the case 4.

Figure 5:
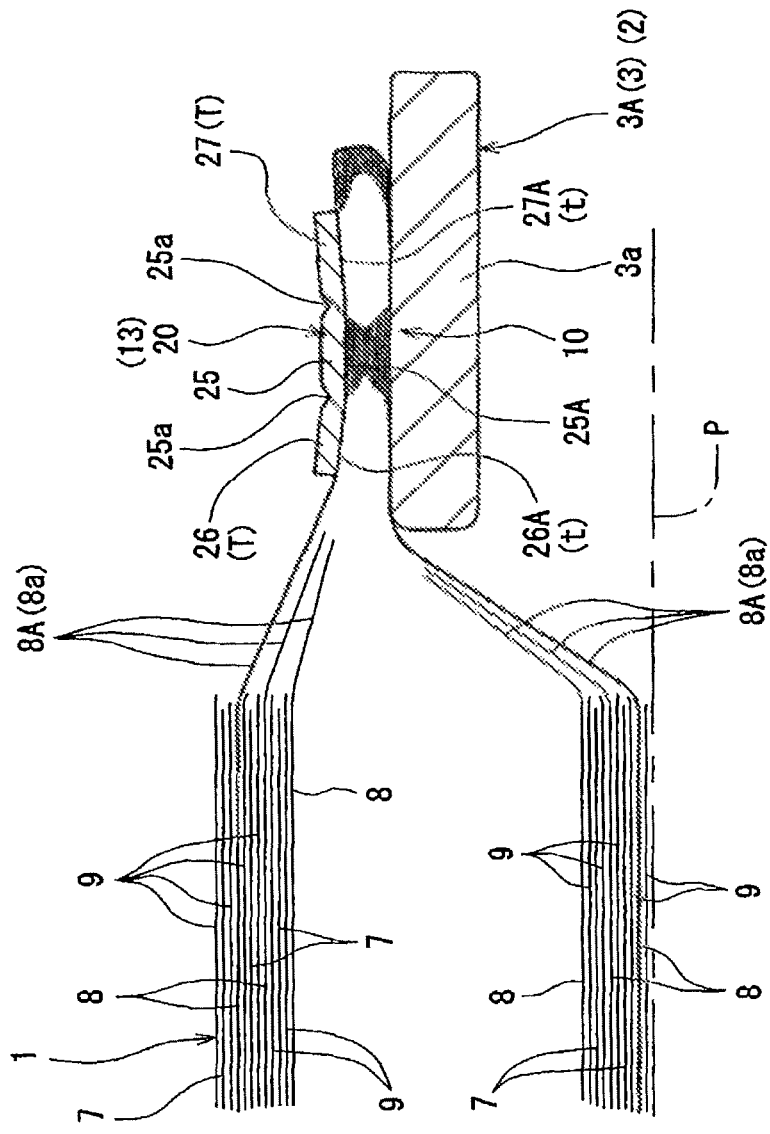
FIG. 5 is a cross sectional view taken along a b-b line of FIG. 3.
Figure 6:
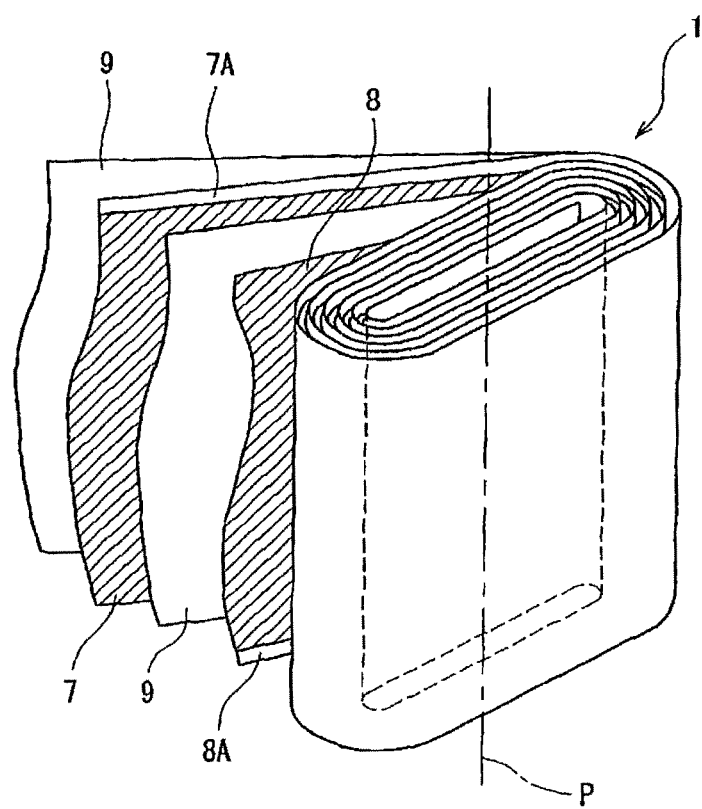
FIG. 6 is a perspective view showing the structure of an electrode assembly in the lithium-ion secondary battery cell.

The power generating element 1 is configured as shown in FIGS. 2, 5 and 6 such that a band-shaped positive electrode foil 7 made of aluminum foil and coated with a positive-electrode active material, and a band-shaped negative electrode foil 8 made of cupper foil and coated with a negative-electrode active material are alternately laminated with an interposing separator 9, 9 which is an insulator being interposed therebetween, and with the positive electrode foil 7 and the negative electrode foil 8 being displaced oppositely to each other in the direction of the axis P, and are wound in a spiral form such that the shape seen from the side presents an elliptic shape. At both ends, which are opposite to each other in the direction of the axis P, of the power generating element 1, protrusion portions 7A and 8A in which aluminum foil and cupper foil are exposed are formed as an uncoated portion of active material. A straight portion 7a (which appears to be longitudinally oriented in FIG. 1) in the positive electrode protrusion portion 7A is joined in a conductive manner to a counter-electrode platelike portion 2A as a contact portion of the positive electrode current collector 2 with the laminated positive electrode foils 7 being bundled. A straight portion 8a (which appears to be longitudinally oriented in FIG. 1) in the negative electrode protrusion portion 8A is joined in a conductive manner to a counter-electrode platelike portion 3A as a contact portion of the negative electrode current collector 3 with the laminated negative electrode foils 8 being bundled.

That is, the power generating element 1 is formed into a shape which is thin in a fore-and-aft direction (direction of arrow X) which is a direction orthogonal to the direction of the axis P, and is long in an up-and-down direction (direction of arrow Y) which is another direction orthogonal to both the direction of the axis P and the fore-and-aft direction. It is noted that for the sake of understanding the drawings, the spacing between the positive and negative electrode foils 7 and 8 and the separator 9 is intentionally enlarged and drawn in FIG. 2.

Figure 3:
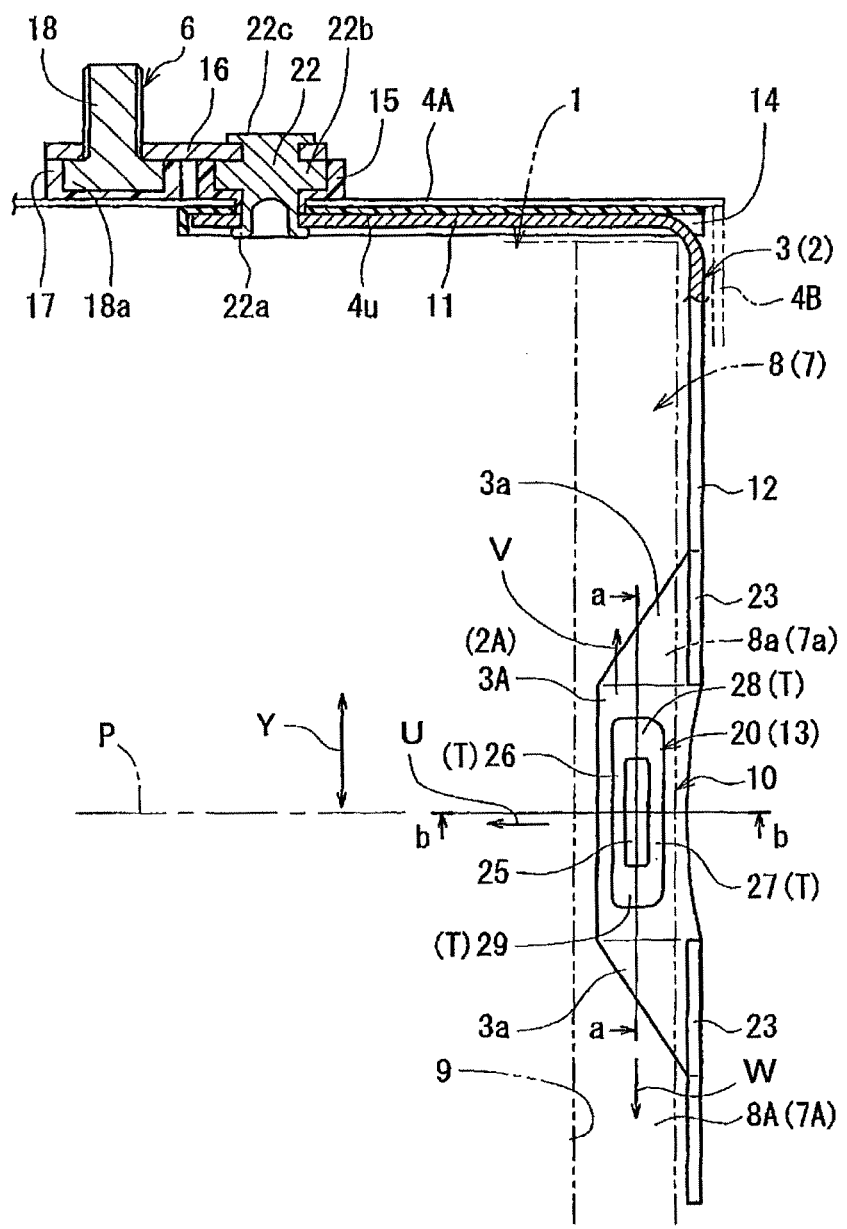
FIG. 3 is partially broken-away front view showing a current collector and a structure relating thereto in the lithium-ion secondary battery cell.

The positive electrode current collector 2 made of aluminum or aluminum alloy and the negative electrode current collector 3 made of copper or copper alloy have the same structure with each other. Accordingly, description will be made on one of the current collectors, which is the current collector 3. As shown in FIGS. 2 and 3, the current collector 3 is a part having a substantially L shape in front view, which is made up of a horizontal upper portion 11 to be engaged to the top plate 4A of the case 4, and a longitudinal current collecting portion 12 to be bent and suspended from an end portion of the horizontal upper portion 11. The horizontal upper portion 11 is connected in a conductive manner to the electrode portion 6 via a rivet 22 made of metal and to be inserted through a hole (no reference symbol) formed in an inner side end portion of the horizontal upper portion 11. The longitudinal current collecting portion 12 is connected in a conductive manner to the protrusion portion 3A via a pair of counter-electrode platelike portions 3A and 3A formed in parallel in a vertically intermediate portion of the longitudinal current collecting portion 12.

The pair of counter-electrode platelike portions 3A and 3A are formed so as to be appropriately spaced apart from each other in the width direction of the power generating element 1 (direction of arrow X), and so as to protrude vertically and inwardly (direction of the axis P) from the longitudinal current collecting portion 12. Each of the counter-electrode platelike portion 3A is of a plate shape, and a reinforcing plate portion 3a which can be bent at an appropriate angle is formed on both sides (upper and lower sides) of the counter-electrode platelike portion 3A. Further, the longitudinal current collecting portion 12 is formed into a shape in which a triangular platelike portion 23 integrally including the reinforcing plate portion 3a are aligned side by side on both sides of each counter-electrode platelike portion 3A in the direction of arrow X via a hole portion 24.

The positive and negative electrode portions 5 and 6 have the same structure with each other. Therefore, description will be made on one of the electrode portions, which is the electrode portion 6. The horizontal upper portion 11 is held in surface contact with a lower surface 4u of the top plate 4A of the case 4 via a first insulation member 14 made of plastic and having a downward facing U-shape in cross section. The rivet 22 in a state of being enclosed by a second insulation member 15 made of plastic is connected in a conductive manner to the horizontal upper portion 11 by a tubular lower portion 22a of the rivet 22 being dropped into and inserted through a circular hole (no reference symbol) of the top plate 4A and a circular hole (no reference symbol) of the first insulation member 14, and the lower end portion of the rivet 22 being caulked. It is to be noted that the rivet 21 of the positive electrode is made of aluminum, and the rivet 22 of the negative electrode is made of copper.

A circular-column upper portion 22c is formed on the top side of a square body portion 22b of the rivet 22. A conduction plate 16 made of metal and inserted into the circular-column upper portion 22c is connected in a conductive manner to the rivet 22 by the upper end portion of the circular-column upper portion 22c being caulked. An electrode bolt 18 in a state in which a square base portion 18a is being contained in a third insulation member 17 having a bottom and made of plastic is engaged in a circular hole (no reference symbol) formed in an inner area of the conduction plate 16.

Next, a joint portion 10 (current collecting structure) of negative electrode will be mainly described. As shown in FIGS. 1 to 5, the joint portion 10 is formed in such a way that a counter-electrode platelike portion 3A of the current collector 3 and a clip 20 are joined to a protrusion portion 8A with ultrasonic welding (an example of welding which involves pressurizing) with the protrusion portion 8A being disposed between the clip 20 which is a metal material (plate-like metal material) 13 and the counter-electrode platelike portion 3A of the current collector 3. That is, the joint portion 10 of negative electrode refers to a region where the electrode foil 8, the current collector 3, and the metal material 13 are joined with ultrasonic welding. The joint portion 10 of positive electrode refers to a region where the electrode foil 7, the current collector 2, and the metal material 13 are joined with ultrasonic welding. The clip 19 of positive electrode is made of aluminum, the clip 20 of negative electrode is made of copper, and the metal material 13 is formed of the same material as that of the corresponding electrode foil. As the result of that the metal material 13 and the electrode foil are formed of the same material, the metal material 13 and the electrode foil are well-matched to each other, and thus the joined portion becomes to have an excellent joint strength and reliability.

As shown in FIG. 3, a joint portion 25 is formed in a central portion in the up-and-down and left-and-right directions of the clip 20 having a rectangular shape in the up-and-down direction (direction of arrow Y). There are non-joint portions 26, 27, 28 and 29, which are not weld joined to the protrusion portion 8A, in any of the up, down, left and right directions of the joint portion 25. To be specific, there are non-joint portions T (non-joint portions 26, 27, 28 and 29) on both sides of the joint portion 25 in the direction of the axis P, and on both sides of the joint portion 25 in the up-and-down direction Y. That is, there are non-joint portions T in all the surroundings of the joint portion 25. As a result of this, an end portion with respect to the joint portion (central portion) 25 is formed in all around the perimeter.

Figure 4:
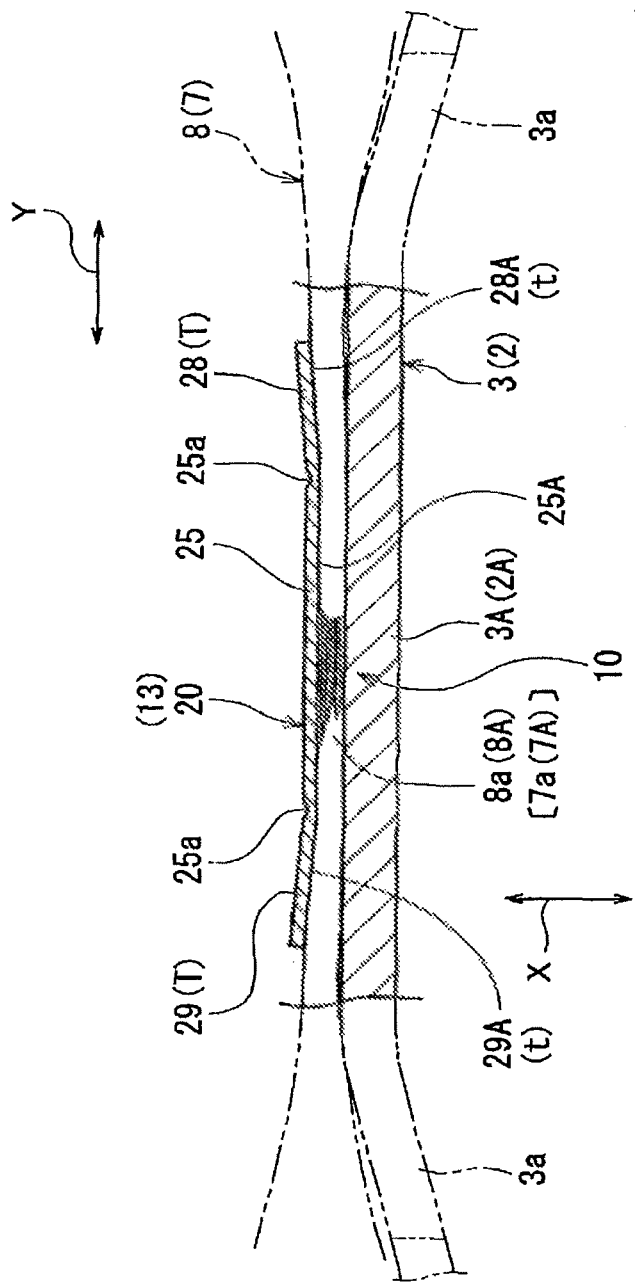
FIG. 4 is a cross-sectional view taken along an a-a line of FIG. 3.
Figure 10A:
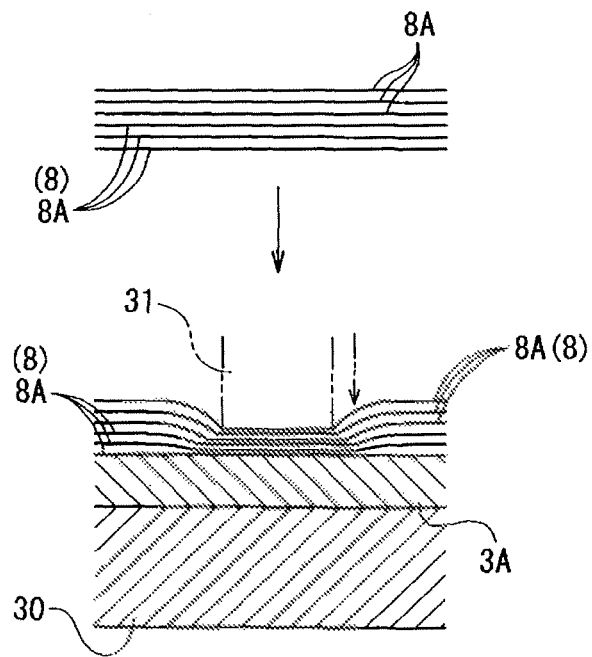
FIG. 10A is an explanatory diagram showing a situation in which a defective condition occur due to a conventional pressurizing method.
Figure 10B:
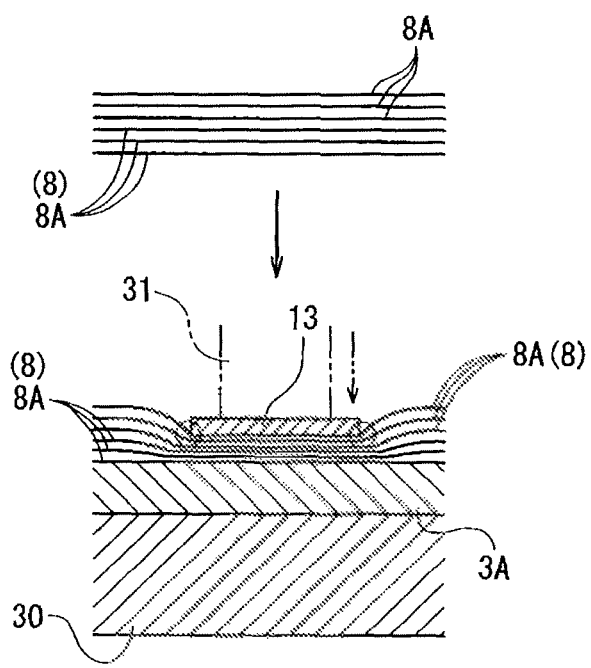
FIG. 10B is an explanatory diagram showing a situation in which a defective condition occur due to another conventional pressurizing method.

FIGS. 4 and 5 respectively show the outline structure of a cross section of a joint portion 10 by ultrasonic welding. In ultrasonic welding by an ultrasonic welding machine not shown (hereafter, simply referred to as a "welding machine"), after arranging that the power generating element 1 etc. lies sideways and the counter-electrode platelike portion 3A of the current collector 3 is supported by the anvil 30 (see FIG. 10) which is a pedestal portion of a welding machine, the protrusion portion 8A of the power generating element 1 is placed on the counter-electrode platelike portion 3A, the clip 20 is placed further thereon, and a tip (not shown) of the welding machine presses the clip 20 downward (toward the anvil 30) and vibrates in parallel, so that the counter-electrode platelike portion 3A of the current collector 3 and the clip 20 are joined to the protrusion portion 8A of the power generating element 1. The portion to be pressurized by the tip in the clip 20 becomes the joint portion 25 having a long rectangular shape (may be an elliptical shape), which is longer in the up-and-down direction (direction of arrow Y) in plan view, and is formed substantially at a center in the up-and-down and left-and-right directions of the clip 20 (see FIG. 3). It is to be noted that dual welding means which performs laser welding to the joint portion 25 after ultrasonic welding is performed may be adopted, and doing so allows the electrode foil 8 and the current collector 3 to be more securely joined in a conductive manner.

In the joint portion 10, the clip 20 is set to have a thickness (rigidity) of a level that allows the joint portion 25 to deform concavely by the pressurization with the tip. A triangular depression 25a which is present at the boundary between the joint portion 25 and the non-joint portion T in the front face side (side opposite to the electrode foil 8) of the clip 20, that is, at the boundary between the central portion and the end portion of the clip 20 is a depression formed by being pressed by an annular perimeter ridge formed in the pressing surface of the tip. In Embodiment 1, the portion to be pressurized in the clips 19 and 20 corresponds to the joint portion 25.

As the result of the joint portion 25 undergoing concave deformation by the pressurization with the tip in the clip 20, a joint bottom face (central region) 25A which is a part of the opposing face with the electrode foil 8 of the clip 20 is further displaced in the direction to move closer to the counter-electrode platelike portion 3A of the current collector 3 than a circumferential side bottom face t (end regions 26A, 27A, 28A and 29A) which is the opposing face other than the joint bottom face 25A. In other words, the circumferential side bottom face t is displaced in a direction away from the counter-electrode platelike portion 3A of the current collector 3 than the joint bottom face 25A is. Then, the clip 20 is formed in a state in which the circumferential side bottom face t is present in all the surroundings of the joint bottom face 25A. Further, with the non-joint portions 26 to 29 being bent with respect to the joint portion 25 with a triangular depression 25a as the boundary, the joint portion 25 is depressed. In other words, the non-joint portions 26 to 29 are bent with respect to the joint portion 25 with the triangular depression 25a as a boundary, thereby being bent over in a direction away from the counter-electrode platelike portion 3A of the current collector 3. Therefore, the end regions 26A to 29A of the opposing face are formed into a tapered surface which is inclined so as to approach the counter-electrode platelike portion 3A of the current collector 3 as the location advances toward the joint bottom face 25A. In other words, the end regions 26A to 29A of the opposing face are formed into a tapered surface which is inclined such that the displacement in a direction away from the counter-electrode platelike portion 3A of the current collector 3 gradually increases as the location advances toward the outer edge of the clip 20.

As a result of this, among the protrusion portion 8A of the power generating element 1 which is compressed via the clip 20 by the pressurization with tip, a portion corresponding to the joint bottom face 25A will be subjected to a highest pressure and portions corresponding to the end regions 26A to 29A of the opposing face will be compressed while the pressure gradually decreases as the location advances away from the joint bottom face 25A. Therefore, the total thickness of the protrusion portion 8A changes such that the thickness of the portion corresponding to the joint bottom face 25A which is subjected to a highest pressure becomes smallest, and the thickness gradually increases as the location advances away in up, down, left and right directions therefrom. Conversely, the circumferential side bottom face t is configured to exert a guiding effect to gradually increase the thickness of the protrusion portion 8A.

Figure 9:
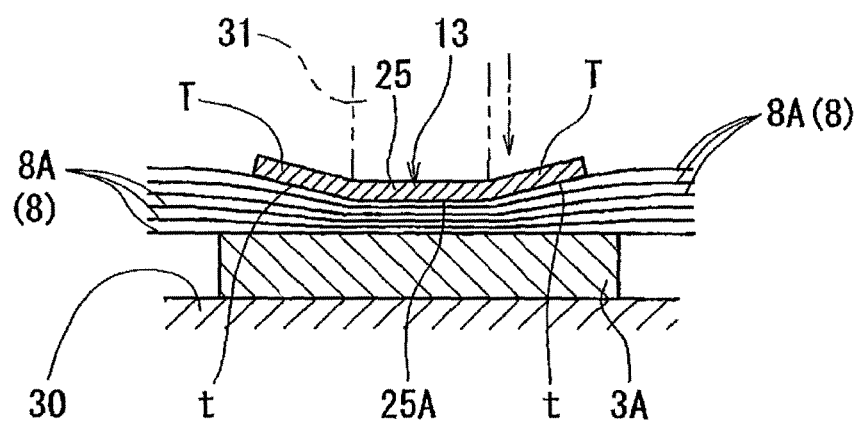
FIG. 9 is an explanatory diagram showing a situation in which a defective condition is avoided by a pressurizing method relating to the present embodiment.

Accordingly, as shown in FIG. 9, it becomes not likely or less likely that unfavorable conditions such as cracking or tearing occur in the end portion 8A (7A) of the power generating element 1 due to stress concentration caused by the pressurization with the tip 31 associated with welding.

Further, in Embodiment 1, the metal material 13 is formed into a shape which as a whole bends backward such that the circumferential side bottom face t which follows the planar joint bottom face 25A becomes a tapered inclination surface which gently bents over with respect to the joint bottom face 25A. That is, in Embodiment 1, an area of stress concentration in a conventional product (see FIG. 10) is pressed by the circumferential side bottom face t which is a tapered inclination surface, and its pressing amount gradually decreases as the location advances away from the joint bottom face 25A. For that reason, stress concentration will not occur in the protrusion portion 8A of the power generating element 1. At the edge of the circumferential side bottom face t, the pressing force of the protrusion portion 8A will clearly decrease compared with the pressing force at the joint bottom face 25A. Therefore, stress concentration will not occur in the protrusion portion 8A at an edge of the circumferential side bottom face t.

As a result, the stress concentration due to a rapid change (rapid increase or decrease) in the thickness of the protrusion portion 8A will be mitigated or eliminated so that unfavorable conditions such as cracking or tearing which occur in the protrusion portion 8A caused by pressurization during welding, will be suppressed or avoided, and ultrasonic welding is well performed. That is, it becomes possible to disperse, suppress or eliminate the stress concentration, which is apt to act on the protrusion portion 8A, due to pressure and vibration associated with welding (ultrasonic welding, etc.). As a result of that, it becomes possible to join in a reasonable manner the protrusion portion 8A and current collector 3 in the spiral power generating element 1, and thus to provide a lithium-ion secondary battery cell (electric storage device) which is suitable for actual uses.

Further, the following effects can be expected. In the lithium-ion secondary battery cell A of the structure according to Embodiment 1, the power generating element 1 is supported by a pair of current collectors 2 and 3. To be specific, there is provided a structure in which the power generating element 1 is supported by joint portions 10 and 10, which are made up of a pair of left and right counter-electrode platelike portions 2A and 3A and the left and right longitudinally oriented portions 7a and 8a in the protrusion portions 7A and 8A, and the electrode foils 7 and 8 in the joint portions 10 and 10 are given a role to support the weight of the power generating element 1. Therefore, when the battery cell A is mounted on a running vehicle such as an automobile, vibration due to driving vibration and running vibration and stress due to them all act on the joint portions 10 and 10, that is, the protrusion portions 7A and 8A. Therefore, there is concern on a problem that damages such as cracking are likely to occur at boundaries with the joint portions 10 and 10 in the protrusion portions 7A and 8A. However, as so far described, a configuration in which the joint bottom face 25A of the metal 10 material 13 lies closer to the electrode foils side with respect to the circumferential side bottom face t, in other words, a structure in which the circumferential side bottom face t of the metal material 13 advances away from the electrode foil with respect to the joint bottom face 25A allows the mitigation or avoidance of the stress concentration at the boundary area of the joint portions 10 and 10 in the protrusion portions 7A and 8A, thus eliminating the problem of occurrence of cracking or the like in the joint portions 10 and 10, even during long-hour driving and long-term usage. Thus, it is possible to provide a lithium-ion secondary battery cell A which has a long life and a high reliability, and is thus suitable for a running vehicle as well.

<Embodiment 2>

Figure 7:
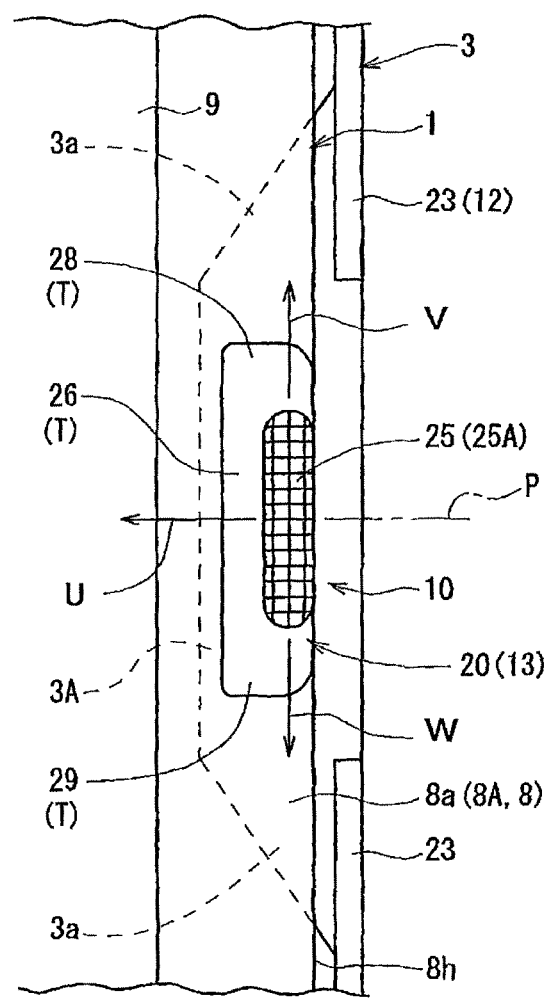
FIG. 7 is an enlarged front view showing another structure of a metal material used in the lithium-ion secondary battery cell.

The metal material 13 may be configured, as shown in FIG. 7, such that there exist non-joint portions T (non-joint portions 26, 28 and 29), and also there exist non-joint bottom faces t (end regions 26A, 28A and 29A) which are inclined tapered surfaces at three locations including one side (the central side of the power generating element 1) of the joint portion 25 in the direction of the axis P, and both sides of the joint portion 25 in the up-and-down direction Y. In the metal material 13 in which non-joint portions T are formed in the surroundings of the joint portion 25, a non-joint portion T functions as a portion to press and support the metal material 13 such that it will not move during ultrasonic welding. This function is similarly exerted in the clips 19 and 20 in the electric storage device of Embodiment 1 described above.

With the joint portion 10 being a reference, the electrode foil 8 is formed so as to expand on three sides including central side (direction of arrow U) of the power generating element 1, and the upper side (direction of arrow V) and the down side (direction of arrow W) in the up-and-down direction Y. Therefore, the non-joint portions 26, 28 and 29 may be formed on those three sides with respect to the joint portion 25.

In that configuration, an end (end in the left-and-right direction) 8h of the protrusion portion 8A is preferably matched in position to the outer end of the metal material 13. However, more or less, the end 8h may protrude further than the outer end of the metal material 13. In that configuration, it cannot be said that there is no risk that damages such as cracking due to welding and vibration may occur on the foil 8 corresponding to the outer end of the metal material 13. However, since there is nothing to be supported on that side (opposite to the direction of arrow U), for example, even if the protrusion portion of an end 8h is damaged, it will not develop into further unfavorable conditions.

It is to be noted that the present invention is not limited to the configuration of each of above-described embodiments. Moreover, the present invention is not limited to the effects described above. It is of course possible to appropriately add modifications to the present invention within a range not departing from the spirit of the present invention.

Moreover, the present invention intends to adopt configurations of another embodiment in each of the embodiments whenever possible. That is, the configuration in each embodiment can be interchangeably used between the embodiments.

For example, the joining method in the joint portion 10 may be a welding method (resistance welding, spot welding, and others) other than ultrasonic welding. What is essential is, welding which involves pressurization will suffice.

Further, the current collectors 2 and 3 may be a press molded part of plate material in which a band-shaped plate material is given a cut and bent to be folded in two, thereby forming counter-electrode platelike portions 2A and 3A.

Figure 8:
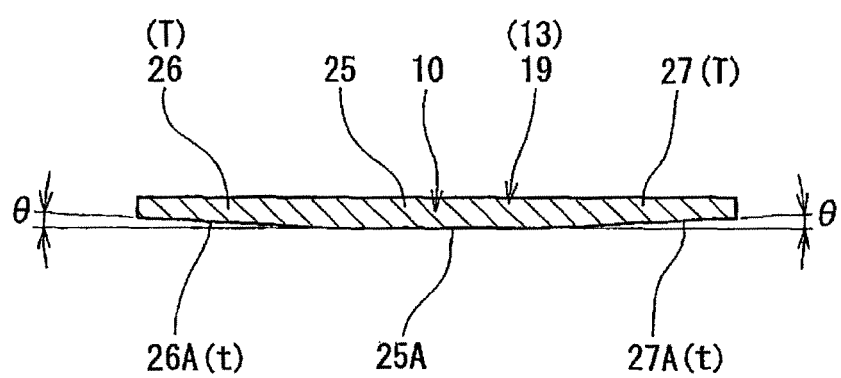
FIG. 8 is a cross-sectional view showing a further structure of a metal material used in the lithium-ion secondary battery cell.

Further, as the shape of the metal material 13, configuration may be such that as with the cross-section view shown in FIG. 8, the non-joint bottom face t is made to be a tapered surface with an inclination angle θ such that the thickness of the joint portion 25 is constant, and the thickness of the non-joint portion T decreases as the location advances away from the joint portion 25. In this configuration, since the metal material 13 is originally configured such that the joint bottom face 25A is located closer to the counter-electrode platelike portion 3A side of the current collector 3 than the non-joint bottom face t of the surroundings thereof is, the metal material 13 may be one which does not exhibit concave deformation and bending deformation even when welding involving pressurization is performed. Further, although not shown, the metal material 13 may be a planar metal material 13 with a step having a joint bottom face 25A, a circumferential side bottom face t of a tapered inclination surface with a short length, and an outer plane (surface in parallel with the joint bottom face) extending to the outer side thereof. The circumferential side bottom face t having a short length serves as a mitigation area of stress concentration, and is expected to have a function of preventing the occurrence of unfavorable conditions such as cracking or tearing in the end portion 8A (7A).

Further, the electrode assembly may not be of a winding type, but a lamination type in which multiple sheets of each of positive electrode foils, negative electrode foils, and separators are laminated.

Further, the metal material 13 is applied to both the protrusion portion 7A of positive electrode and the protrusion portion 8A of negative electrode. However, the metal material 13 may be applied to only either one of them.

Further, a lithium-ion secondary battery cell has been described in the afore-mentioned embodiments. However, the kinds and sizes (capacities) of battery cell are arbitrary.

Further, the present invention will not be limited to a lithium-ion secondary battery cell. The present invention may be applicable to various secondary battery cells and so on, primary battery cells, and capacitors such as an electric double layer capacitor.

The invention claimed is:

1. An electric storage device, comprising:
an electrode assembly including a positive electrode foil and a negative electrode foil, which are laminated into a multilayer in a mutually insulated state, the electrode assembly having at least one protrusion portion, the protrusion portion being formed of an end portion of any one of the positive electrode foil and the negative electrode foil and protruding in a laminated state in a first direction from a side end of another electrode foil;
a current collector including a platelike contact portion in contact with the protrusion portion, the platelike contact portion extending in a second direction perpendicular to the first direction; and
a metal material including an opposing face opposed to the protrusion portion, the metal material being configured such that the protrusion portion is interposed between the platelike contact portion of the current collector and the metal material in a third direction perpendicular to the first and second directions,
wherein at least an end region in the second direction of the opposing face is displaced in a direction away from the platelike contact portion of the current collector more than a central region in the second direction of the opposing face is displaced, and
wherein a shape of the metal material and a shape of the current collector are asymmetric, such that, in an overlapping portion of the metal material and the current collector in the third direction, the end region of the opposing face inclines with respect to the central region of the opposing face, whereas the platelike contact portion extends parallel to the central region of the opposing face.

2. The electric storage device according to claim 1, wherein the end region of the opposing face of the metal material is formed into a tapered surface which is inclined such that a displacement amount in a direction away from the platelike contact portion of the current collector gradually increases as a location advances toward an outer edge of the metal material.

3. The electric storage device according to claim 1, wherein the metal material has a platelike shape, and at least an end portion of the metal material in the second direction is bent over so that a displacement occurs in the opposing face.

4. The electric storage device according to claim 3, wherein the metal material is joined to the protrusion portion by welding involving pressurization, and
wherein the end portion of the metal material is bent by the pressurization.

5. The electric storage device according to claim 4, wherein a depression for bending is formed along a boundary between the end portion of the metal material and a central portion of the metal material.

6. The electric storage device according to claim 5, wherein the depression has a reverse triangular shape.

7. The electric storage device according to claim 5, wherein the depression is formed by the pressurization with a ridge formed in a pressing surface of a tip.

8. The electric storage device according to claim 1, wherein a thickness of the metal material in the third direction is less than a thickness of the platelike contact portion.

9. The electric storage device according to claim 1, wherein the metal material has a platelike rectangular shape, and corners of the metal material are rounded.

10. An electric storage device, comprising:
   an electrode assembly including a positive electrode foil and a negative electrode foil, which are laminated into a multilayer in a mutually insulated state, the electrode assembly having at least one protrusion portion, the protrusion portion being formed of an end portion of any one of the positive electrode foil and the negative electrode foil and protruding in a laminated state in a first direction from a side end of another electrode foil;
   a current collector including a platelike contact portion in contact with the protrusion portion, the platelike contact portion extending in a second direction perpendicular to the first direction; and
   a metal material including an opposing face opposed to the protrusion portion, the metal material being configured such that the protrusion portion is interposed between the platelike contact portion of the current collector and the metal material in a third direction perpendicular to the first and second directions,
   wherein at least an end region in the second direction of the opposing face is displaced in a direction away from the platelike contact portion of the current collector more than a central region in the second direction of the opposing face is displaced,
   wherein a shape of the metal material and a shape of the current collector are asymmetric, such that, in an overlapping portion of the metal material and the current collector in the third direction, the end region of the opposing face inclines with respect to the central region of the opposing face, whereas the platelike contact portion extends parallel to the central region of the opposing face, and
   wherein the protrusion portion is asymmetric.

* * * * *